(12) United States Patent
Hekizono

(10) Patent No.: US 7,073,183 B2
(45) Date of Patent: Jul. 4, 2006

(54) LOCKING MECHANISM OF DISK DEVICE

(75) Inventor: Kiyoshi Hekizono, Tokyo (JP)

(73) Assignee: NEC Corporation, Tokyo (JP)

( * ) Notice: Subject to any disclaimer, the term of this patent is extended or adjusted under 35 U.S.C. 154(b) by 658 days.

(21) Appl. No.: 10/326,068

(22) Filed: Dec. 23, 2002

(65) Prior Publication Data

US 2003/0137917 A1    Jul. 24, 2003

(30) Foreign Application Priority Data

Jan. 24, 2002  (JP)  ............................. 2002-015446
Nov. 28, 2002  (JP)  ............................. 2002-346183

(51) Int. Cl.
*G11B 21/22*    (2006.01)

(52) U.S. Cl. .................................................... 720/610
(58) Field of Classification Search ................ 720/610, 720/637, 639, 657
See application file for complete search history.

(56) References Cited

U.S. PATENT DOCUMENTS

| 4,400,808 | A | * | 8/1983 | Saito et al. | .................. 720/639 |
| 4,710,910 | A | * | 12/1987 | Ejiri | ............................ 720/610 |
| 5,231,556 | A | * | 7/1993 | Blanks | ..................... 360/256.2 |
| 5,253,218 | A | * | 10/1993 | Suzuki | ..................... 360/98.04 |
| 6,181,663 | B1 | * | 1/2001 | Kakuta et al. | ............... 720/610 |
| 6,603,723 | B1 | * | 8/2003 | Minase | ........................ 720/673 |

FOREIGN PATENT DOCUMENTS

| JP | H09-044955 A | 2/1997 |
| JP | 2000-076766 A | 3/2000 |
| JP | 2000-90533 A | 3/2000 |
| JP | 2000-173146 A | 6/2000 |
| JP | 2001-137937 A | 5/2001 |
| JP | 2001-155403 A | 6/2001 |

\* cited by examiner

*Primary Examiner*—William Korzuch
*Assistant Examiner*—Christopher R. Magee
(74) *Attorney, Agent, or Firm*—Sughrue Mion, PLLC

(57) ABSTRACT

Provided is a locking mechanism of a disk device in which the impact resistance performance can be improved easily at a low cost. In the locking mechanism, a locking pin is provided in a casing and, at the same time, provided in a tray are a locking lever supported to be capable of oscillating having a locking part on the tip to be engaged with the locking pin, an ejection lever supported to be capable oscillation for pressing the locking lever so as to oscillate the locking lever to detach the locking part from the locking pin, and a movable piece holding unit for holding a movable piece provided in one end part of the ejection lever so as to set aside the ejection lever. Further, an ejection lever balance weight having a prescribed mass is provided on the opposite side to the ejection lever with respect to the oscillation center of the ejection lever.

17 Claims, 10 Drawing Sheets

LOCKING MECHANISM OF DISK DEVICE

FIELD OF THE INVENTION

The present invention relates to a locking mechanism of a disk device which performs reading or writing by loading a disk as a recording medium, and particularly, to a locking mechanism of a loading mechanism which performs insertion/ejection of a tray to which a disk is loaded.

BACKGROUND OF THE INVENTION

Conventionally, the so-called drawer system has been used as a locking mechanism of a disk device. In the drawer system, releasing operation of a locking mechanism provided on a loading mechanism is performed by oscillation-driving a locking lever through a locking lever oscillation energizing member as a power source when used in a thin-type disk device mounted (built-in or provided outside) mainly on a notebook personal computer. Also, in the system, when keeping the locking state of the locking mechanism, the locking lever is fixed by a self-attraction type solenoid so that the locking lever does not release the lock of the locking mechanism. FIG. 8 to FIG. 10 are schematic views of the configuration of a conventional disk device as described.

This type of disk device comprises a tray 4 for loading a disk 2 to be an information recording medium, and a casing 1 inside which the tray 4 is housed to be capable of being inserted/ejected. The tray 4 is housed inside the casing 1 to be movable in the upward/downward direction (see an arrow L1) with respect to the casing 1 as shown in FIG. 8. When loading or unloading the disk 2 onto/from the tray 4, the tray 4 is pulled out from the casing 1. When writing information onto the disk 2 or reading the information therefrom, the tray 4 is pushed into the casing 1 so that the tray 4 is completely set inside the casing 1. Then, a disk drive device 3 provided in the tray 4 is activated to perform writing or reading of information to/from the disk 2.

FIG. 9 shows a schematic view of the configuration of a locking mechanism A for keeping the tray 4 to be housed inside the casing 1. The main part of the locking mechanism comprises a locking pin 5 provided on the casing 1 side and a locking lever 6 provided on the tray 4 side. Further, on the tray 4 side, provided are various structural elements necessary for engaging/releasing a locking part 6a with/from the locking pin 5 by operating the locking lever 6.

The locking lever 6 having the protruded locking part 6a on the tip to be engaged with the locking pin 5, as shown in FIG. 9, is mounted on the tray 4 to be capable of oscillating with a locking lever shaft 24 being a fulcrum. Further, it is energized to oscillated in a direction where the locking part 6a is engaged with the locking pin 5, that is, in a counterclockwise direction in FIG. 9 by a locking lever oscillation energizing member 7 composed of a spring and the like.

Inversely, an ejection lever 12 for releasing the locking part 6a from the locking pin 5 by oscillating the locking lever 6 in a clockwise direction, as shown in FIG. 10, is mounted on the tray 4 to be capable of oscillating with an ejection lever shaft 25 being a fulcrum. Further, it is energized to oscillate in a direction where a pressing piece 12a of the ejection lever 12 presses the locking lever 6, that is, in a counterclockwise direction in FIG. 9, by an ejection lever oscillation energizing member 15.

A movable piece 11a is attached to the ejection lever 12 and corresponding to this, a self-attraction type solenoid 11 is fixed on the tray 4 side. The self-attraction type solenoid 11 holds the movable piece 11a by a permanent magnet (not shown). Thereby, the ejection lever 12 is kept to be in a state shown in FIG. 9, that is the state where a pressing piece 12a formed in the ejection lever 12 does not press the locking lever 6. In the state shown in FIG. 9, the locking part 6a hooks onto the locking pin 5 so that the locking mechanism A is locked.

By operating an ejection button 10 shown in FIG. 8 in the state shown in FIG. 9, the solenoid 11 is excited by a command from a control circuit (not shown) and a magnetic force repulsing the magnetic force of the permanent magnet is generated. Thus, the movable piece 11a is detached from the permanent magnet by the magnetic force of the solenoid 11, the ejection lever 12 is oscillated in a counterclockwise direction by a force applied by the ejection lever oscillation energizing member 15, and the pressing piece 12a presses the locking lever 6 thereby oscillating the locking lever 6 in a clockwise direction opposing to the force applied by the locking lever oscillation energizing member 7. As a result, the locking part 6a of the locking lever 6 is detached from the locking pin 5 thereby to release the locking state so that the tray 4 can be ejected from the casing 1. FIG. 10 shows the state where the lock is released.

As shown in FIG. 10, when the lock is released by detaching the locking lever 6 and the locking pin 5 by operating the ejection button 10 as described, the tray 4 is pressed by an ejection mechanism B comprising a tray ejection power source 8 such as a spring or the like shown in FIG. 8, a tray ejection lever 9 and the like so as to be pushed out of the casing 1 in the forward direction with respect to the casing 1, that is, in the downward direction (see an arrow L2) in FIG. 10. Then, the final step of the pull-out operation is performed by a user through grabbing a front panel 17 (see FIG. 8).

Furthermore, a mechanism for attracting the movable piece 11a to the solenoid 11 by returning the state of the ejection lever 12 shown in FIG. 10 again back to the position shown in FIG. 9 comprises a reset lever 14 mounted on the tray 4 to be capable of oscillating with a reset lever shaft 26 being a fulcrum.

The reset lever 14 is engaged with the ejection lever 12 which oscillates in a counterclockwise direction (see an arrow L3) by the energizing force from the ejection lever oscillation energizing member 15 so that it is always oscillated in a clockwise direction (see an arrow L4) by the oscillating force of the ejection lever 12 in a counterclockwise direction. Further, in the vicinity of the end portion of the reset lever 14 on the opposite side to the part where the reset lever 14 is engaged with the ejection lever 12, a reverse-doglegged bent part 14a as a part of the reset lever 14 to be in contact with the locking pin 5 is formed due to the relative position shift generated between the casing 1 and the tray 4 caused by the inserting/ejecting action of the tray 4, that is, the position shift of the reset lever 14 against the locking pin 5.

First, by pulling out the tray 4, the reset lever 14 together with the tray 4 are moved in the downward direction (the arrow L2) in FIG. 10 and the reset lever 14 is to be in the state shown in FIG. 10. By pushing the pulled-out tray 4 inside the casing 1, a guide part 14a of the reset lever 14 is pressed by the locking pin 5 so that the reset lever 14 oscillates in a counterclockwise direction (in the opposite direction to the arrow L4) in FIG. 10. Thereby, the ejection lever 12 engaged with the reset lever 14 is oscillated in a clockwise direction (in the opposite direction to the arrow L3) so that the movable piece 11a attached to the ejection lever 12 is again to be attracted to the permanent magnet of the solenoid 11.

The shapes of the reset lever 14 and the engagement the reset lever 14 and the ejection lever 12 are designed in such a manner that the ejection lever 12 overstrokes and oscillates in a clockwise direction so as to press the movable piece 11a which is in contact with the solenoid 11 further to the solenoid 11. Therefore, the movable piece 11a is surely stuck to the solenoid 11 when the movable piece 11a is attracted again to the permanent magnet of the solenoid 11. However, in the case of such a design with overstroking, there faces a problem that an excessive stress is to work on the ejection lever 12 and the reset lever 14. Thereby, it is likely to cause damages.

In order to overcome such a problem, the movable piece 11a is attached to the ejection lever 12 through a resin spring 13. Thereby, because of the resin spring 13, the movable piece 11a allows a prescribed amount of play for the ejection lever 12.

Further, in this type of disk device, it is common to have an emergency ejection lever 16 for forcibly detaching the locking lever 6 from the locking pin 5 by a manual operation in case of breakdowns of the solenoid 11 or other members and in case when ejecting the tray 4 before applying power source to the personal computer.

The emergency ejection lever 16, as shown in FIG. 9, is mounted on the tray 4 to be capable of oscillating through an emergency ejection lever shaft 28. By pressing an operation part 16a of the emergency ejection lever 16 through inserting a thin stick from a hole 17a provided on the front panel 17, the emergency ejection lever 16 is oscillated, as shown in FIG. 10, in a counterclockwise direction (see an arrow L5). Thereby, the locking lever 6 associated with the emergency ejection lever 16 is oscillated in a clockwise direction (see an arrow L6) so that the locking part 6a is forcibly detached from the locking pin 5.

The locking mechanism of a disk device comprising the locking pin 5 on the casing 1 side and the locking lever 6 and other structural elements on the tray 4 side has been described as an example. However, there is also a disk device comprising, inversely, the locking pin 5 on the tray 4 side and the locking lever 6 and other structural elements on the casing 1 side. In any case, the basic structure and operational condition are substantially the same as those described above.

There is a problem in the conventional locking mechanism of the disk device using the solenoid described above. When impact is applied to the disk device, a torque is applied to the locking lever, the ejection lever and the like by the impact or the reaction force of the impact so that the lock is released by the rotation of the lever. Particularly, the structural parts themselves such as the movable piece which is attracted to the solenoid and the ejection lever which drives the locking lever by holding the movable piece when releasing the lock have a prescribed mass. Therefore, moment is generated in the members due to the external impact. Further, if a torque sufficient to release the movable piece from the solenoid is generated in the ejection lever in a direction overcoming the attraction force of the permanent magnet of the solenoid, the lock is to be released. Thus, it causes a problem that the locking lever is detached from the locking pin so that the tray to which a disk is loaded is to be ejected from the casing unexpectedly.

On the other hand, when the locking mechanism of a disk device is designed under consideration of the impact resistance, there generates another problem of increasing the designing cost so that the price of the product is increased.

SUMMARY OF THE INVENTION

The present invention has been designed to overcome the foregoing problems. An object of the present invention is to simplify the changes in the design of the locking mechanism and lower the price while improving the impact resistance, specifically, in a locking mechanism of a disk device using a solenoid as a holding unit.

In order to achieve the aforementioned object, a locking mechanism of a disk device according to the present invention, which is mounted in between a tray for holding and conveying a disk as an information recording medium and a casing for storing the tray to be capable of being inserted and ejected, comprises: a locking pin mounted on either one of members out of the casing or the tray; a locking lever with a locking part on the tip to be engaged with the locking pin, which is held to be capable oscillating by the other member out of the casing or the tray; and an ejection lever mounted to be capable of oscillating for keeping or releasing the engagement between the locking pin and the locking part by energizing a prescribed oscillation movement to the locking lever; and a holding unit for keeping the engagement between the locking pin and the locking part through holding one end of the ejection lever against the energizing force in the opposite direction which is normally set beforehand. Also, a balance weight is mounted on the opposite side to the ejection lever with respect to the oscillation center of the ejection lever.

When an external impact is applied to the locking mechanism of the disk device, a force is applied to change the position of the ejection lever so that the locking pin is released. However, the present invention uses a balance weight so as to set the center of the gravity of the rotation part of the ejection lever to be in the oscillation center of the ejection lever or the vicinity. Therefore, the force generated by the external impact acting to release the engagement between the locking pin and the locking lever is limited to a smaller value compared to that of the force by which the holding unit holds the ejection lever.

Thus, with the present invention, it can prevent the tray from being ejected from the casing carelessly by releasing the lock of the locking mechanism even if an external impact force applied to the locking mechanism.

The locking mechanism of the present invention further comprises a reset lever. The reset lever oscillates the ejection lever by being pressed by the locking pin when the tray is ejected from the casing, and moves one end of the ejection lever to a position to be held by the holding unit.

Therefore, one end of the ejection lever is to be held by the holding unit when the tray is ejected from the casing so that generation of noise due to oscillation of the ejection lever can be prevented.

More specifically, the locking mechanism of the disk device for housing a tray inside a casing according to the present invention, which is provided in the tray for holding a disk to be an information recording medium and the casing for housing the tray to be capable of being inserted and ejected, may have a configuration comprising: a locking pin mounted on either one of members out of the casing or the tray; while comprising: on the other member out of the casing or the tray, a locking lever having a locking part on the tip to be engaged with the locking pin, which is supported to be capable of oscillating; an ejection lever supported to be capable of oscillating for pressing a prescribed part of the locking lever so as to oscillate the locking lever in such a direction that the locking part is detached from the locking pin; and a holding unit for holding a movable piece provided on one end of the ejection lever so as to set aside the ejection lever to such a position that the ejection lever does not press the locking lever. Also, it may comprise a balance weight having a prescribed weight is provided on the opposite side to the center of the gravity of the ejection lever with respect to the oscillation center of the ejection lever. In this case, it is desirable that the balance weight be so provided to the ejection lever that the center of the gravity of the ejection lever is to be in the oscillation center of the ejection lever or the vicinity.

With the configuration, even when an impact for causing the ejection lever to be oscillated is applied to the disk device moment generated in one part and moment generated in the other part with respect to the oscillation center of the ejection lever balance out mutually, thereby suppressing the oscillation of the ejection lever. Therefore, the movable piece provided on one end of the ejection lever can be prevented from detaching from the solenoid thereby suppressing the oscillation of the ejection lever. Thus, it can suppress releasing of the lock. When the center of the gravity of the ejection lever is in the oscillation center of the ejection lever, the balancing-out effect of the moment described above is remarkable so that the impact resistance performance of the locking mechanism is further improved. It can be achieved without adding a balance weight to the existing disk device. Therefore, the impact resistance performance can be easily improved at a low cost without going through a major change in the design of the mechanism itself.

Further, it is desirable to have a configuration in which a balance weight having a prescribed weight is provided on the opposite side to the center of the gravity of the locking lever with respect to the oscillation center of the locking lever. It is more desirable that the balance weight be so provided to the locking lever that the center of the gravity of the locking lever is to be in the oscillation center of the locking lever or the vicinity.

With this configuration, even when an impact for causing the ejection lever to be oscillated is applied to the disk device, moment generated in one part and moment generated in the other part with respect to the oscillation center of the locking lever balance out mutually, thereby suppressing the oscillation of the locking lever. Therefore, the locking part provided on the tip of the locking lever can be prevented from detaching from the locking pin. Thus, it becomes possible to improve the impact resistance performance of the locking mechanism. When the center of the gravity of the locking lever is in the oscillation center of the locking lever, the balancing-out effect of the moment described above is remarkable so that the impact resistance performance of the locking mechanism is further improved.

The locking mechanism of a disk device may further comprise a reset lever being supported to be capable of oscillating while a part of which is being engaged with the ejection lever, which comes to be in slide-contact with the locking pin due to a position shift generated between the tray and the casing by the inserting and ejecting action of the tray, and thereby receives pressuring force from the locking pin to oscillate the ejection lever so that the movable piece comes to be in contact with the holding unit. It is also desirable to have a configuration in which a balance weight having a prescribed weight is provided on the opposite side to the center of the gravity of the reset lever with respect to the oscillation center of the reset lever. It is more desirable that the balance be so provided to the reset lever that the center of the gravity of the reset lever is to be in the oscillation center of the reset lever or the vicinity.

Thereby, each moment generated in the reset lever is balanced out with each other, thereby suppressing the oscillation of the reset lever. Thus, oscillation of the, ejection lever in connection with the oscillation of the reset lever can be suppressed. As a result, it can suppress releasing of the lock so that the impact resistance performance can be improved.

The locking mechanism of a disk device may further comprise an emergency ejection lever being supported to be capable of oscillating while a part of which is being engaged with the locking lever, which is oscillated by an external manual operation while energizing a torque to the locking lever, and thereby oscillates the locking lever in such a direction that the locking part of the locking lever is detached from the locking pin. It is also desirable to have a configuration in which a balance weight having a prescribed weight is provided on the opposite side to the center of the gravity of the emergency ejection lever with respect to the oscillation center of the emergency ejection lever. It is more desirable that the balance weight be so provided in the emergency ejection lever that the center of the gravity of the emergency ejection lever is to be in the oscillation center of the emergency ejection lever or the vicinity.

Thereby, in the same manner as described, each moment generated in the emergency ejection lever is balanced out with each other, thereby suppressing the oscillation of the ejection lever. Thus, oscillation of the locking lever in connection with the oscillation of the emergency ejection lever itself can be suppressed. As a result, it can suppress releasing of the lock so that the impact resistance performance can be improved.

Also, each balance weight described above functions as described even when each of them is provided alone and still can improve the impact resistance performance of the locking mechanism.

The locking mechanism of a disk device according to the present invention also employs a configuration, comprising: a locking pin mounted on either one of members out of the casing or the tray; while comprising: on the other member out of the casing or the tray, a locking lever having a locking part on the tip to be engaged with the locking pin, which is supported to be capable of oscillating; a locking lever movable unit to be engaged with the other end portion of the tip of the locking lever for oscillating the locking lever in such a direction that the locking part is detached from the locking pin. Further, a balance weight having a prescribed weight is provided on the opposite side to the center of the gravity of the locking lever with respect to the oscillation center of the locking lever. Also, it is desirable the balance weight be so provided in the locking lever that the center of the gravity of the locking lever is to be in the oscillation center of the locking lever or the vicinity.

With the configuration, it can suppress rotation of the locking lever and the like which release the lock of the locking mechanism by an external impact. Therefore, the impact resistance performance of the locking mechanism can be easily improved at a low cost.

DETAILED DESCRIPTION OF THE PREFERRED EMBODIMENTS

First Embodiment

Figure 1:
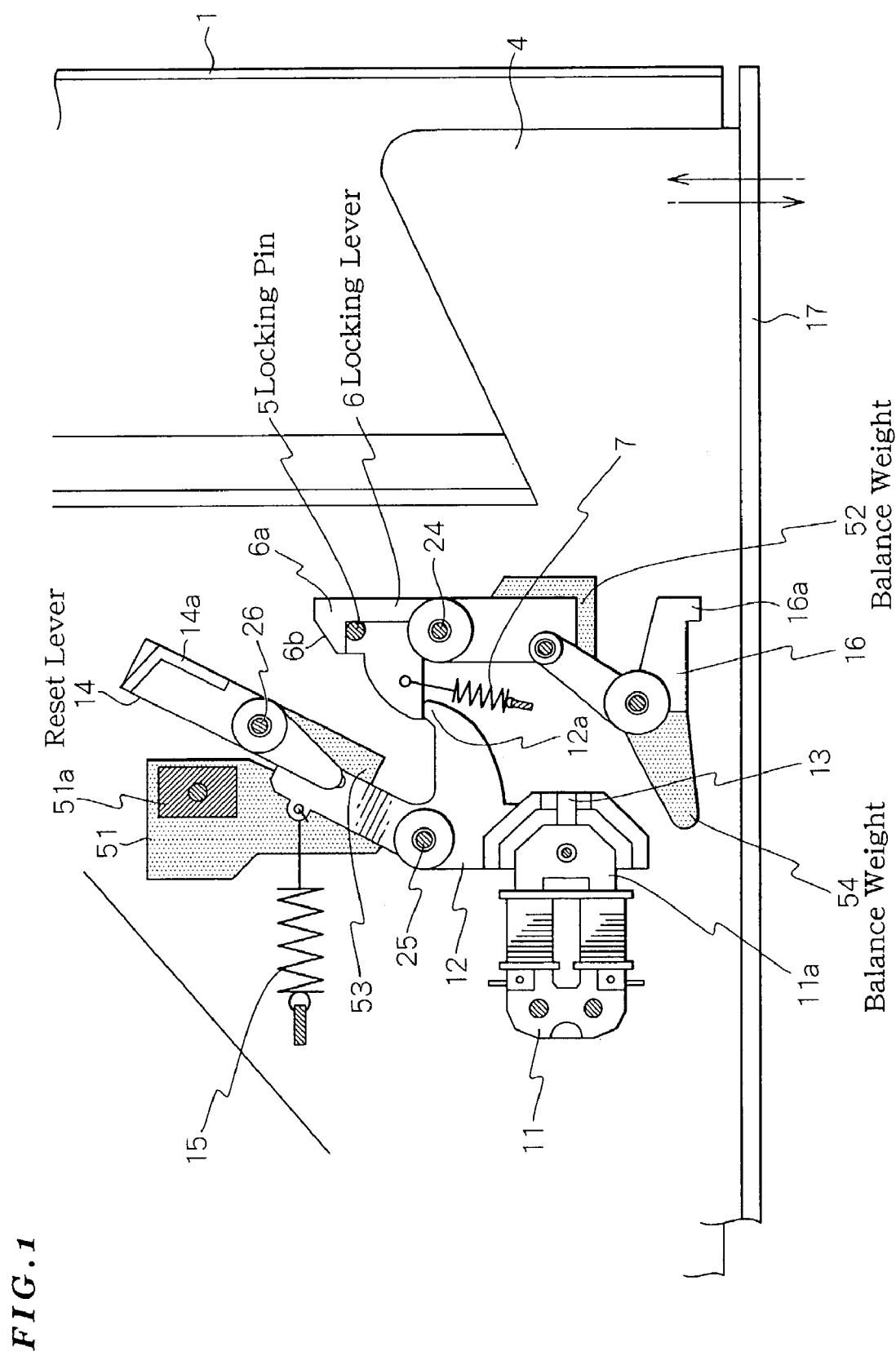
FIG. 1 is a block diagram showing an example of the configuration of a locking mechanism according to a first embodiment of the present invention.
Figure 2:
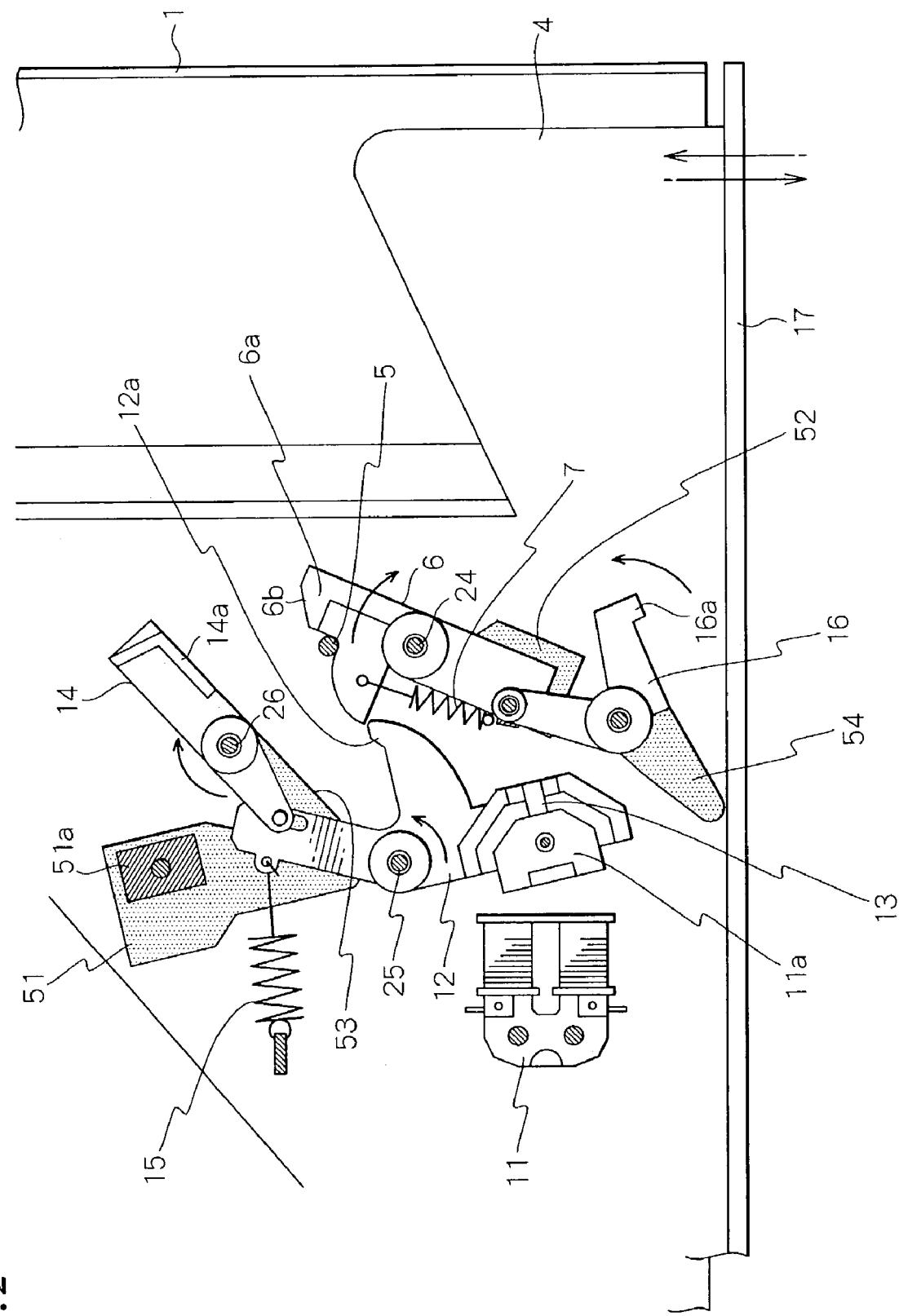
FIG. 2 is a schematic view showing the state where the lock of the locking mechanism is released in the first embodiment of the present invention.
Figure 3:
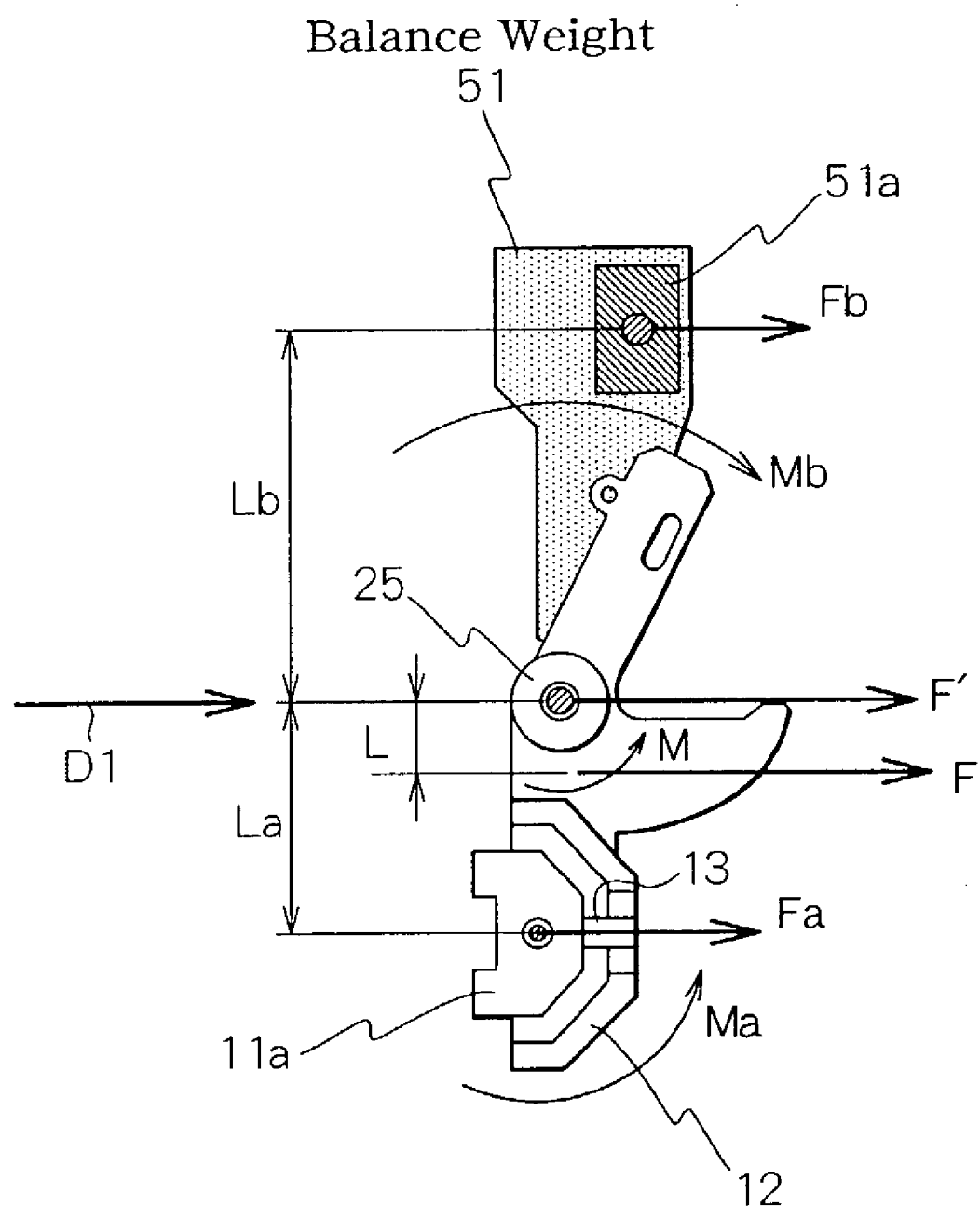
FIG. 3 is a sectional block diagram taken out from an example of the configuration of the locking mechanism according to the first embodiment of the present invention.
Figure 4:
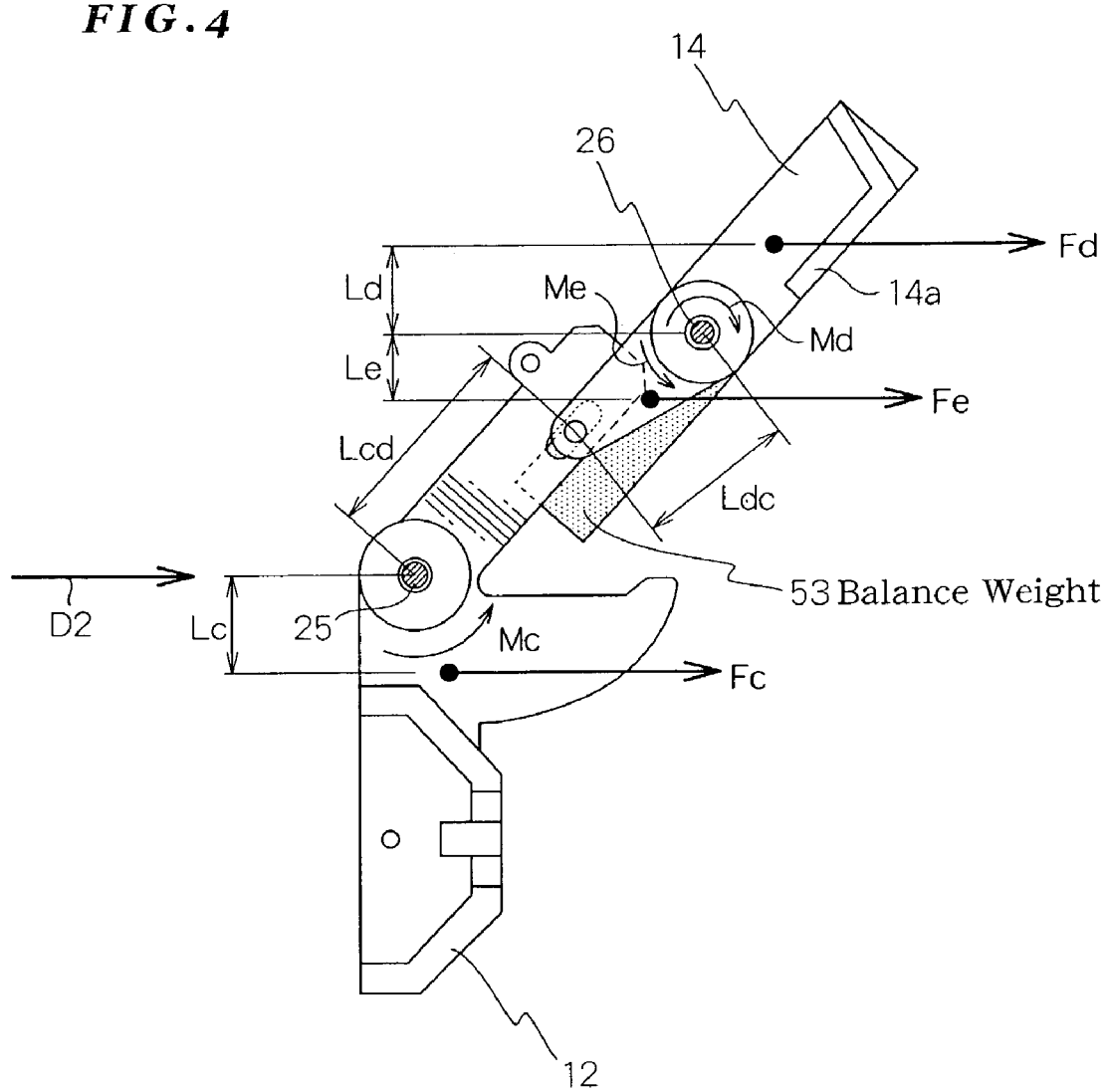
FIG. 4 is another sectional block diagram taken out from an example of the configuration of the locking mechanism according to the first embodiment of the present invention.

A first embodiment of the present invention will be described in the followings by referring to FIG. 1 to FIG. 4. FIG. 1 and FIG. 2 are the schematic views showing the whole configuration of the locking mechanism according to the first embodiment. FIG. 3 and FIG. 4 are the sectional block diagrams showing a part of the configuration of the locking mechanism.

(Configuration)

As shown in FIG. 1 to FIG. 4, the basic configuration of a locking mechanism of a disk device of the present invention, which is mounted in between a tray 4 for holding and conveying a disk as an information recording medium and a casing 1 for housing the tray 4 to be capable of being inserted and ejected, comprises: a locking pin 5 provided on either one of members out of the casing 1 or the tray 4; and a locking lever 6 with a locking part 6a to be engaged with the locking pin 5, which is held to be capable of oscillating by the other member out of the casing 1 or the tray 4. The locking mechanism also comprises an ejection lever 12 mounted to be capable of oscillating for keeping or releasing the engagement between the locking pin 5 and the locking part 6a by applying a prescribed oscillation movement to the locking lever 6; and a holding unit for keeping the engagement between the locking pin 5 and the locking part 6a through keeping one end of the ejection lever 12 against the applying force in the opposite direction which is normally set beforehand. Also, there is a balance weight 51 being mounted on the opposite side to the ejection lever 12 with respect to the oscillation center of the ejection lever 12. Further, it is desirable to have a reset lever 14 oscillating the ejection lever 12 by being pressed by the locking pin 5 when the tray 4 is ejected from the casing 1, and moves one end of the ejection lever 12 to a position to be held by the holding unit.

Next, an example in which a solenoid 11 is used as a holding unit will be described by referring to FIG. 1 to FIG. 4. A locking mechanism A according to the embodiment is a locking mechanism of a disk device for holding the tray 4 inside the casing 1, which is provided in the tray 4 for holding and conveying a disk 2 as an information recording medium and the casing 1 for housing the tray 4 to be capable of inserting/ejecting. The locking mechanism A comprises the locking pin 5 on the casing 1 side while comprising, on the tray 4 side, a locking lever 6 having a locking part 6a on the tip to be engaged with the locking pin 5, an ejection lever 12 supported to be capable of oscillating for oscillating the locking lever 6 in such a direction that the locking part 6a is detached from the locking pin 5, and a holding unit 11 for holding a movable piece 11a provided on one end of the ejection lever 12 so as to set aside the ejection lever 12 in the position where the ejection lever 12 does not push the locking lever 6. In the embodiment, the movable piece 11a of the ejection lever 12 is to be held by the holding unit 11. However, one end of the ejection lever 12 may have any other configuration with or without the movable piece 11a as long as the one end of the ejection lever 12 is to be held by the holding unit 11. The holding unit 11 shown in FIG. 1 comprises a permanent magnet (not shown) for attracting one end part of the ejection lever 12 and a solenoid 11 which, when energized (current flows), generates a magnetic force overcoming the magnetic force of the permanent magnet thereby to detach the one end of the ejection lever 12 from the permanent magnet. The holding unit 11 may also have a configuration with a solenoid (11) which generates a magnetic force by being constantly energized for attracting the one end of the ejection lever 12 and detaches the one end of the ejection lever 12 from the solenoid, when not being energized, through the energizing force of an ejection lever oscillation energizing member 15 in the opposite direction to be described later.

Further, the locking mechanism A comprises a reset lever 14 being supported to be capable of oscillating while a part of which is being engaged (linked) with the ejection lever 12. The reset lever 14, due to the position shift generated between the tray 4 and the casing 1 by the inserting and ejecting action of the tray 4, receives pressuring force from the locking pin 5 to oscillate. Thus, the ejection lever 12 is oscillated in a direction that the movable piece 11a is attracted to the permanent magnet of the solenoid 11. Furthermore, the locking mechanism A comprises an emergency ejection lever 16 being supported to be capable of oscillating while a part of which is being engaged with the locking lever 6. The emergency ejection lever 16 is oscillated by an external manual operation while applying a torque to the locking lever 6 and thereby oscillating the locking lever 6 in such a direction that the locking part 6a of the locking lever 6 is detached from the locking pin 5.

The locking lever 6 having the protruded locking part 6a to be engaged with the locking pin 5, as shown in FIG. 1, is mounted on the tray 4 to be capable of freely oscillating with a locking lever shaft 24 being a fulcrum. Also, it is energized to oscillate and energized by a locking lever oscillation energizing member 7 composed of a spring and the like in such a direction that the locking part 6a is engaged with the locking pin 5, that is, in a counterclockwise direction in FIG. 1. Furthermore, there is a sloping guide face 6b provided in the head part of the locking lever 6. Thus, when the tray 4 is pushed into the casing 1, the guide face 6b of the locking lever 6 is pushed by the locking pin 5 opposing the energizing force of the locking lever oscillation energizing member 7. Thereby, the locking lever 6 rotates around the locking lever shaft 24 in a clockwise direction so that the locking part 6a of the locking lever 6 is to engage with the locking pin 5 by the energizing force of the locking lever oscillation energizing member 7 when the locking lever 6 rotates to the position where the guide face 6b is detached from the locking pin 5.

Inversely, the ejection lever 12 for releasing the engagement of the locking part 6a and the locking pin 5 by oscillating the locking lever 6 in a clockwise direction, as shown in FIG. 1, is mounted on the tray 4 to be capable of freely oscillating with an ejection lever shaft 25 being a fulcrum. Also, it is energized to oscillate by the ejection lever oscillation energizing member 15 in such a direction that a pressing piece 12a of the ejection lever 12 presses the locking lever 6, that is, in a counterclockwise direction in FIG. 1.

Further, the movable piece 11a is attached to one end of the ejection lever 12 and, correspondingly, the solenoid 11 is fixed on the tray 4 side as a holding unit. The holding unit 11, as described, comprises a permanent magnet (not shown) for attracting the movable piece 11a of the ejection lever 12 and a solenoid (in the followings, a numeral 11 is used for referring to the solenoid) which, when energized, generates a magnetic force overcoming the magnetic force of the permanent magnet thereby to detach the movable piece 11a of the ejection lever 12 from the permanent magnet. When the tray 4 is housed in the casing 1, the movable piece 11a is attracted by the permanent magnet provided in the solenoid 11 so as to keep the solenoid in an unexcited state. Thereby, the position of the ejection lever 12 is kept in a state shown in FIG. 1, that is, in such a state that the pressing piece 12a formed in the ejection lever 12 does not press the locking lever 6.

When the solenoid 11 is energized by operating an ejection button (corresponds to an ejection button 10 shown in FIG. 7) upon receiving a command from a control circuit (not shown), a magnetic force overcoming the magnetic force of the permanent magnet is generated in the solenoid 11 so that the movable piece 11a is detached from the permanent magnet by the generated magnetic force. Thereby, as shown in FIG. 2, the ejection lever 12 is oscillated in a counterclockwise direction by the energizing force of the ejection lever oscillation energizing member 15. Thus, the pressing piece 12a of the ejection lever 12 presses the locking lever 6 so as to oscillate it in a clockwise direction. Thereby, the engagement between the locking part 6a of the locking lever 6 and the locking pin 5 is released so that it becomes to be in a state where the tray 4 can be pulled out from the casing 1.

Figure 7:
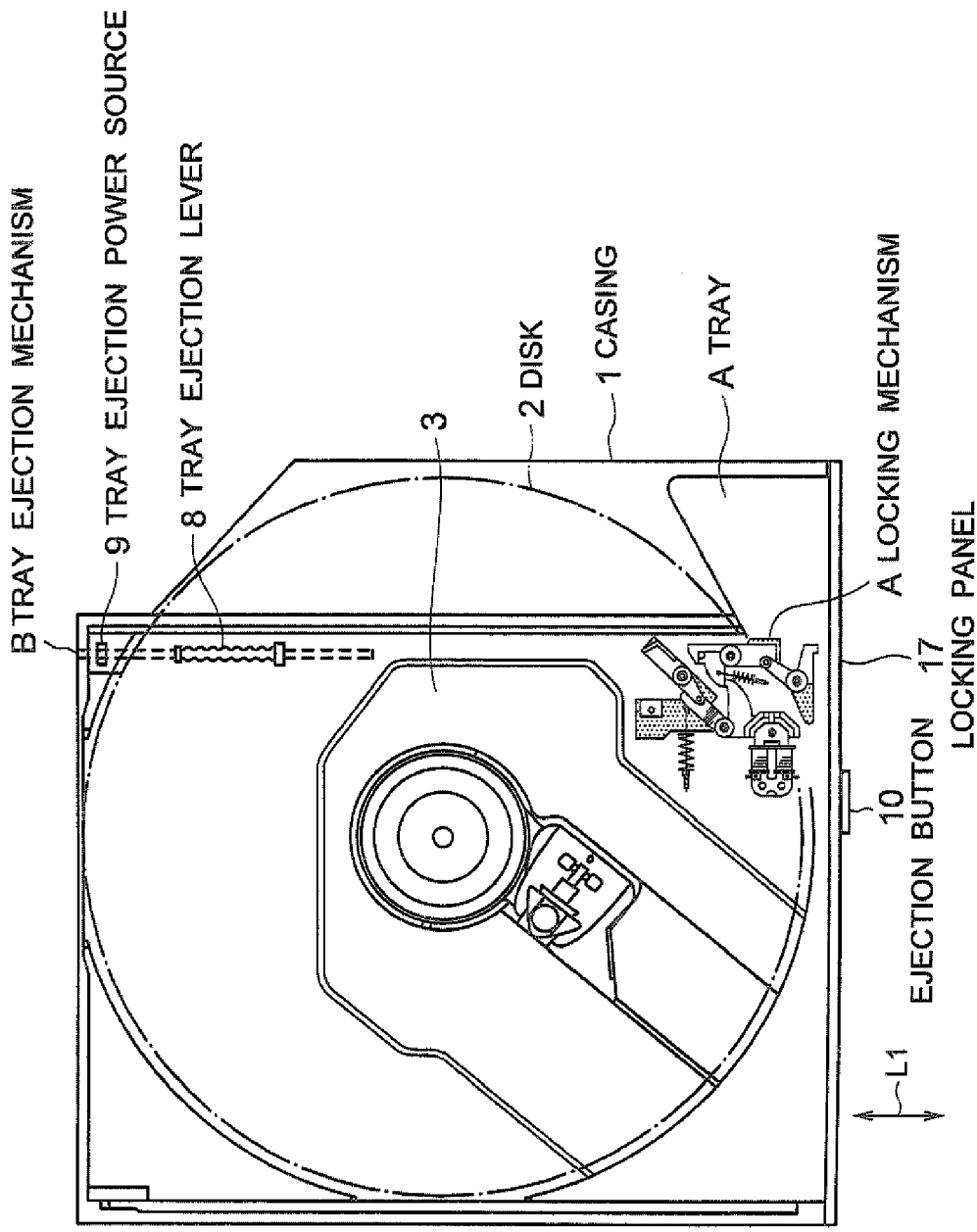
FIG. 7 is a schematic view showing the configuration of one exemplary embodiment of the present invention.

As a result, the tray 4 is ejected from the casing 1 by a tray ejection mechanism (corresponds to a tray ejection mechanism B shown in FIG. 7).

In the embodiment, as shown in FIG. 1 and FIG. 3, an ejection lever balance weight 51 with a prescribed mass is provided on the opposite side to the part where the movable piece 11a is provided with respect to an oscillation center 25 (ejection lever shaft) of the ejection lever 12. FIG. 1 shows an example of the case where the center of the gravity of the ejection lever 12 including the movable piece 11a is on the side closer to the movable piece 11a than the oscillation center 25. The ejection lever balance weight 51 may be provided on the movable piece 11a when the center of the gravity of the ejection lever 12 is on the opposite side to the movable piece 11a. In other words, when the center of the gravity of the ejection lever 12 is not in the oscillation center 25 of the ejection lever 12, the ejection lever balance weight 51 is provided in a prescribed part of the ejection lever 12 on the opposite side to the center of the gravity of the ejection lever 12 with respect to the oscillation center 25.

Thereby, for example, when there is an impact as shown by an arrow D1 in FIG. 3 is applied to a disk device having the locking mechanism A, a force in the arrow D1 direction is generated in the ejection lever 12 itself by the impact force itself or an reaction force against the impact force, which is generated due to the fact that the disk device is fixed. Also, inversely, when there is a force applied to the disk device in the opposite direction to the arrow D1, there may be a case where there is a force generated in the ejection lever 12 itself in the arrow D1 direction due to inertia. In any case, when there is a force in the arrow D1 direction is applied to the ejection lever 12 in a conventional ejection lever 12 without an ejection lever balance weight 51, a moment M, multiplication of an impact force F and a distance L, acts on the ejection lever 12 thereby rotating the ejection lever 12 in the M direction. The reason is that the position of the center of the gravity of the ejection lever 12 is in a position distant from the oscillation center 25 of the ejection lever 12 for the length of the distance L. However, as shown in FIG. 1, in the case of the ejection lever 12 to which the ejection lever balance weight 51 of the present invention shown by a shape covered by dots is added, the force of the permanent magnet of the solenoid for attracting the movable piece 11a overcomes the moment which rotates the ejection lever 12 by the impact, when the center of the gravity of the ejection lever 12 is to be in the oscillation center 25 (or in the vicinity) of the ejection lever 12 due to the effect of the balance weight 51. Thus, there is no force acting on the locking lever 6 releasing the locking pin 5 through the ejection lever 12. As a result, it can prevent the locking lever 6 from detaching from the locking pin 5.

From another point of view, with the conventional locking mechanism as it is, when an impact force Fa is applied to the movable piece 11a of the solenoid in FIG. 3 for some reason, moment Ma, multiplication of the distance La to the position where the movable piece is attached and the impact force Fa, acts on the ejection lever 12 with the movable piece 11a thereby rotating the ejection lever 12. Thus, the locking lever 6 is thereby to be rotated and detached from the locking pin 5. However, as in the present invention, by providing the ejection lever balance weight 51 in the opposite direction to the rotation center of the ejection lever 12, e.g., in the position point symmetrical with the movable piece 11a with respect to the rotation center, moment Mb, multiplication of the distance Lb to the position where the balance weight 51 is attached and the impact force Fb, acting on the balance weight 51 is generated. By making the moment Ma and the moment Mb equal, the moment Ma generated by the movable piece 11a and the moment Mb of the balance weight 51 acting in the opposite direction are balanced out. Therefore, there is no force generated for rotating the ejection lever 12 in a counterclockwise direction. Thus, the locking lever 6 is not to be rotated by the rotation of the ejection lever 12. As a result, it prevents the locking lever 6 from detaching from the locking pin 5.

Thereby, the impact resistance performance can be improved by providing the ejection lever balance weight 51 in the existing locking mechanism A. Therefore, manufacturing cost can be reduced since there is no need to change the design. Also, at the time of newly designing a locking mechanism itself, when the center of the gravity of the ejection lever 12 cannot be positioned in the oscillation center of the ejection lever 12 due to limitation in the positioning in regards to a feeding mechanism of an optical head which is necessary for the disk device or other priorities in the design, the center of the gravity of the ejection lever 12 can be set in the vicinity of the oscillation center 25 of the ejection lever 12 by providing the balance weight as shown in the present embodiment. Therefore, the impact resistance performance can be improved. Consequently, while improving the performance, the versatility of the possible design can be enhanced. Furthermore, it is possible to reduce the size of the device itself.

At this time, a weight member 51a having a prescribed mass may be attached on the ejection lever balance weight 51. In this case, the weight of the weight member 51a is to be altered to be mounted on the balance weight 51 depending on the configuration of the locking mechanism A or the level of the impact resistance performance required. Thereby, the impact resistance performance in a various kinds of locking mechanism A can be easily improved. Especially, when performing a slight adjustment for improving the impact resistance performance after completing the design of the product, it is unnecessary to newly design the shape of the balance weight 51 and the impact resistance performance can be adjusted by altering the mass of the weight member 51a. The effect is remarkable.

Also, as shown in FIG. 1, a locking lever balance weight 52 having a prescribed weight may be provided on the locking lever 6 which is engaged with the locking pin 5 to keep the locking state. In FIG. 1, it is provided on the opposite side to the locking part 6a with respect to the oscillation center 24 of the locking lever 6. However, when the center of the gravity of the locking lever 6 is not in the oscillation center 24 of the locking lever 6, it is provided to a prescribed part of the locking lever 6 on the opposite side to the center of the gravity of the locking lever 6 with respect to the oscillation center 24. The weight of the locking lever balance weight 52 is set so that, by being provided in the locking lever 6, the center of the gravity of the locking lever 6 comes to be in the vicinity of the oscillation center of the locking lever or in the oscillation center.

Thereby, according to an example shown in FIG. 1, in the same manner as described, the moment generated on the locking lever side and the moment generated on the opposite side with respect to the oscillation center 24 of the locking lever 6 are mutually balanced out even if an external impact which is sufficient to oscillate the locking lever 6 is applied to the dick device. Thus, the oscillation of the locking lever 6 is suppressed. As a result, the locking part 6a provided on the tip of the locking lever 6 can be prevented from detaching from the locking pin 5 so that the impact resistance performance of the locking mechanism can be improved.

Now, a reset lever 14 and an emergency ejection lever 16 will be described.

As shown in FIG. 1 and FIG. 4, the reset lever 14 is supported on the tray 4 to be capable of oscillating through a reset lever shaft 26 and one end part is linked with the ejection lever 12. Thereby, the reset lever 14 is to oscillate in accordance with the oscillation of the ejection lever 12. Also, a substantially doglegged guide face 14a which becomes in slide-contact with the locking pin 5 in connection with the inserting/ejecting operation of the tray 4 is formed on the other side of the reset lever 14.

Figure 10:
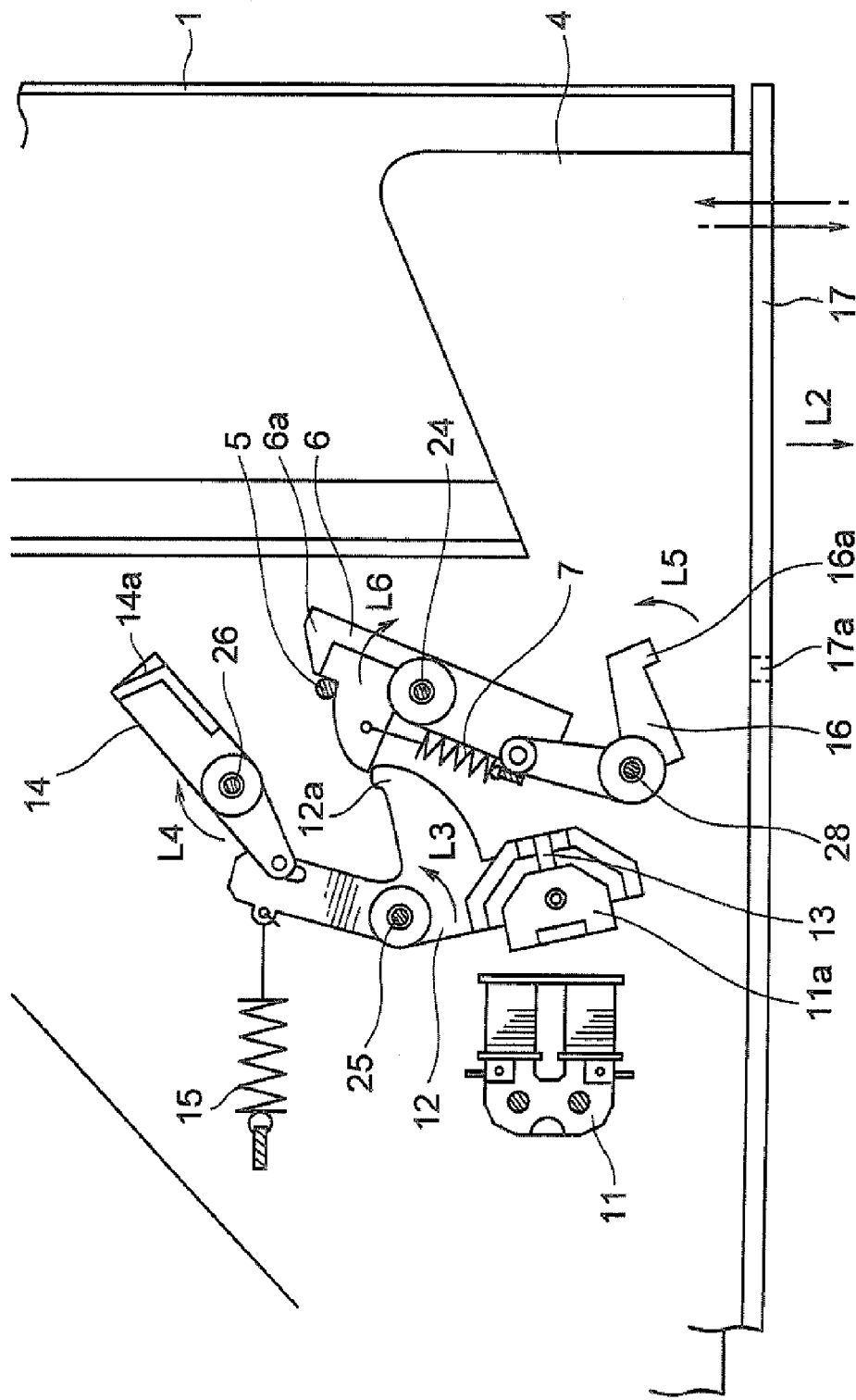
FIG. 10 is a schematic view showing the state where the lock of the locking mechanism shown in FIG. 9 is released.

First, by ejecting the tray 4, the reset lever 14 together with the tray 4 is moved from the state shown in FIG. 2 to the direction to be ejected from the casing 1 (in a downward direction, that is, an arrow L2 direction in FIG. 10). Thereby, the guide face 14a of the reset lever 14 is pressed by the locking pin 5 and the reset lever 14 is oscillated in a counterclockwise direction. Thus, the ejection lever 12 linked with the reset lever 14 is oscillated in a clockwise direction so that the movable piece 11a attached to the ejection lever 12 is to be attracted again to the solenoid 11. Therefore, the reset lever 14 and the ejection lever 12 do not interfere with the locking pin 5 to be let through and the tray 4 is completely ejected from the casing 1.

On the contrary, when pushing the tray 4 into the casing 1, the movable piece 11a of the ejection lever 12 is still attracted to the permanent magnet of the solenoid 11 and the ejection lever 12 is set aside to a position where there is no interference with the locking pin 5. Therefore, the tray 4 can be inserted to the casing 1 without any problems.

Figure 8:
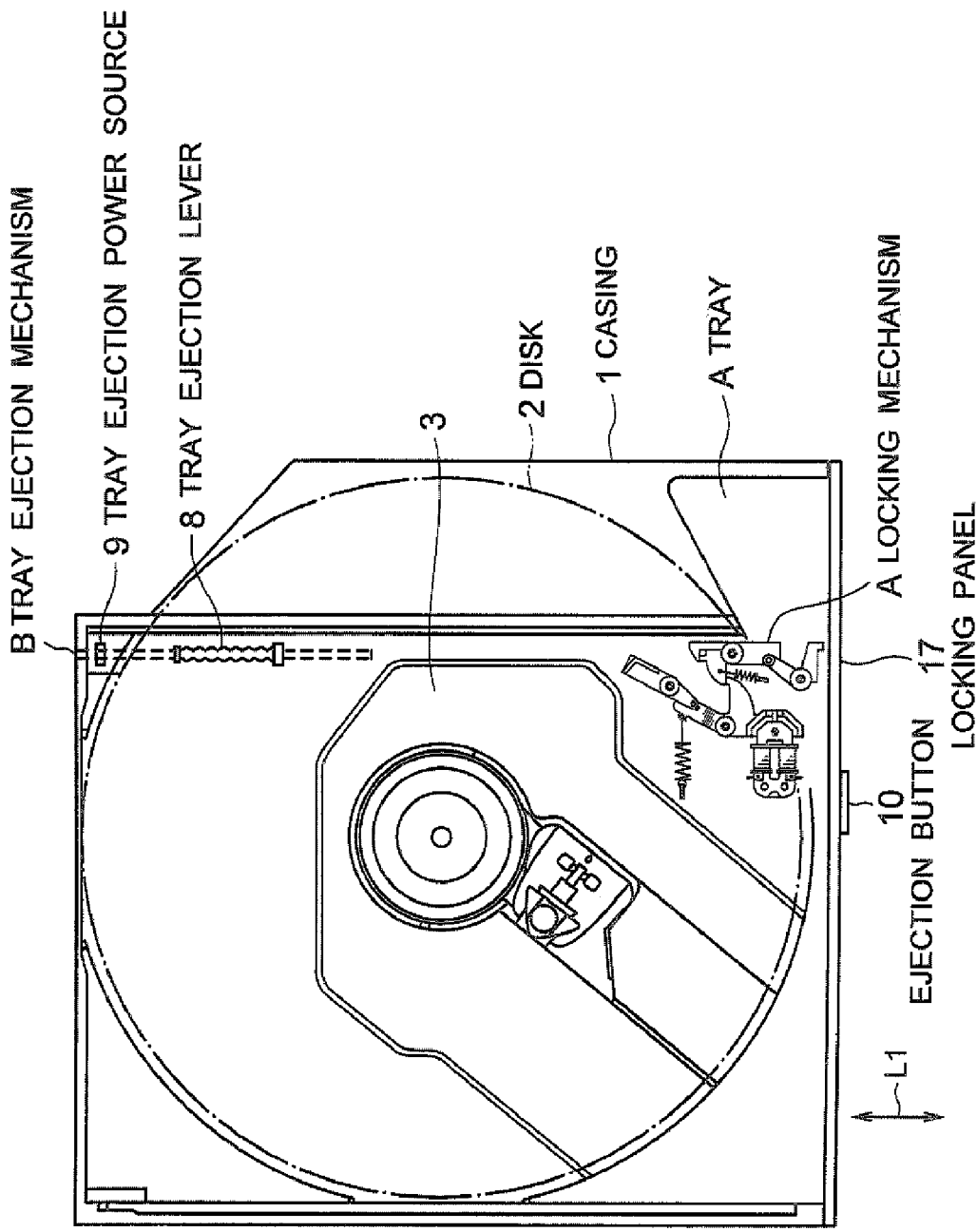
FIG. 8 is a schematic view showing the configuration of a conventional disk device.
Figure 9:
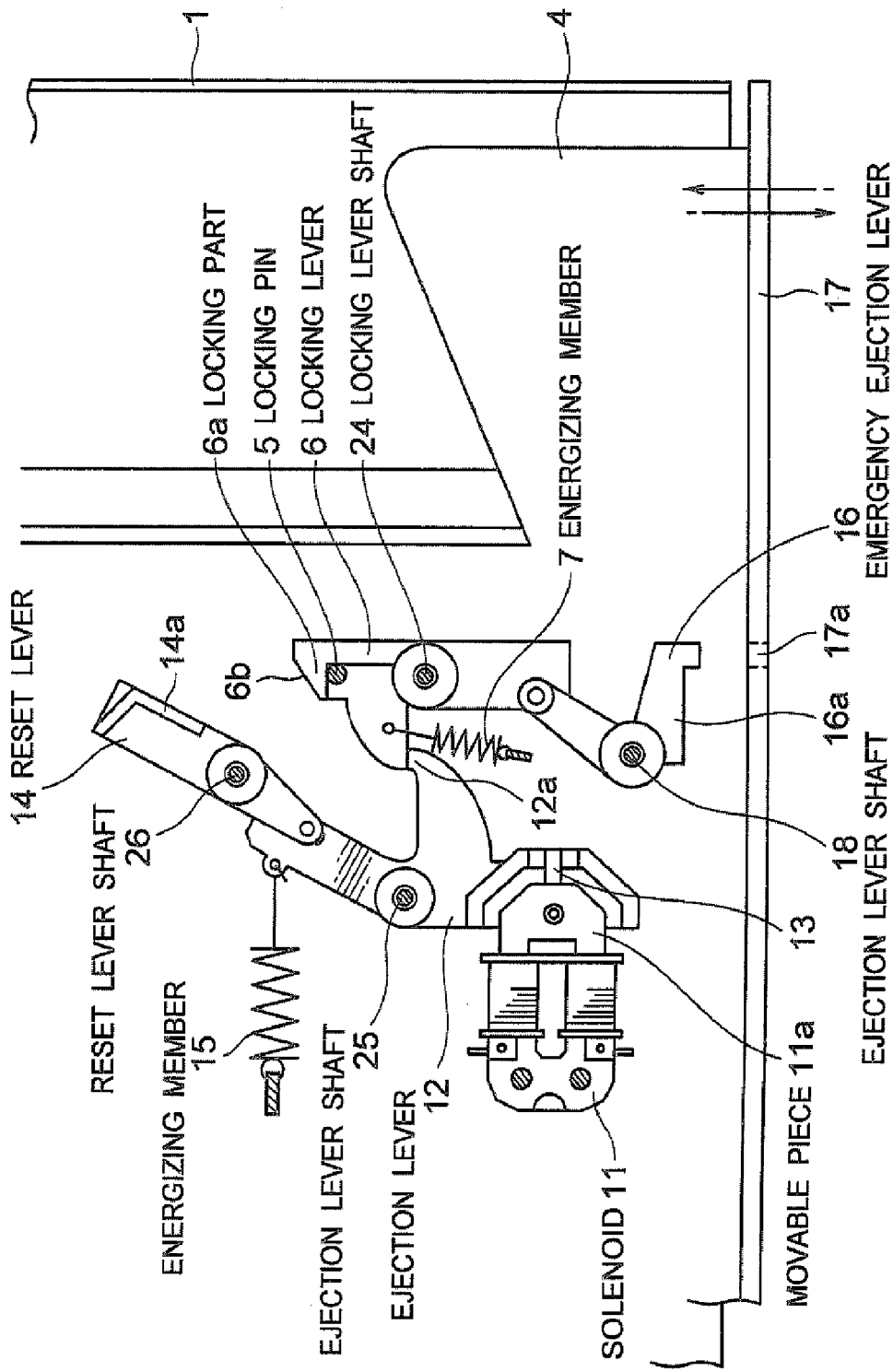
FIG. 9 is a block diagram showing the configuration of a locking mechanism of the disk device shown in FIG. 8.

The emergency ejection lever 16 is a substantially V-shaped member and is mounted on the tray 4 with the bent portion being an oscillation center 28. Further, one end part of the ejection lever is engaged with the end part of the locking lever 6 on the opposite side to the locking part 6a. Thereby, the locking lever 6 can be oscillated through oscillation of the emergency ejection lever 16 so that the engagement between the locking part 6a and the locking pin 5 can be forcibly released. In other words, through pressing the opposite side (operation part 16a) of the above-described engaged part from the front panel 17 side shown in FIG. 8, the emergency ejection lever 16 can be oscillated in a counterclockwise direction. Thereby, the locking lever 6 which is engaged with the emergency ejection lever 16 can be oscillated in a clockwise direction so that the engagement between the locking part 6a and the locking pin 5 can be forcibly released.

Furthermore, in the present invention, a reset lever balance weight 53 may be provided to the reset lever 14 and an emergency ejection lever balance weight 54 may be provided in the emergency ejection lever 16 in the same manner as described above.

FIG. 4 shows the configuration in which the reset lever balance weight 53 is provided to the reset lever 14. In FIG. 4, the reset lever balance weight 53 is provided on the side closer to the engaged part with the ejection lever 12 with respect to the oscillation center 26 of the reset lever 14. At this time, it is desirable that the balance weight have such weight that the center of the gravity of the reset lever 14 comes to be in the vicinity of the oscillation center or in the oscillation center.

Thereby, as described, when there is some impact such as an external impact applied in the arrow D2 direction shown in FIG. 3 to a reset lever having a configuration with a combination of a conventional ejection lever 12 with no ejection lever balance weight 51, an impact force Fc is applied to the center of the gravity of the ejection lever 12 and moment Mc, multiplication of the impact force Fc and the distance Lc to the center of the gravity, acts on the ejection lever 12, thereby rotating the ejection lever 12 in the Mc direction. At the same time, in regards to the conventional reset lever 14 with no reset lever balance weight 53, the center of the gravity is in the position distant for the length of the distance Ld so that moment Md, multiplication of the impact force Fd and the distance Ld, acts on the reset lever 14, thereby rotating the reset lever 14 in the Md direction. Therefore, the rotation of the ejection lever 12 to be engaged therewith is further increased and a force acts on the locking lever 6 which is engaged with the ejection lever 12 to detach the locking pin 5 therefrom. Thus, the locking lever 6 is easily detached from the locking pin 5.

However, in the reset lever 14 of the present invention to which the balance weight 53 is provided, the center of the gravity is to be set in the position distant for the length of the distance Le in the opposite direction with respect to the rotation center of the conventional reset lever 14 so as to have the equal or larger force compared to the moment Mc.

Therefore, moment Me, multiplication of the impact force Fe and the distance Le, acts on the reset lever 14 so as to rotate the reset lever 14 in the Me direction which is the opposite direction to the Md direction. Accordingly, a force balancing the moment Mc acts on the ejection lever 12 which is engaged with the reset lever 14 thereby balancing or reducing the torque. As a result, there is no force acting on the locking lever 6 which is contacted with the ejection lever 12 to detach it from the locking pin 5. This, it prevents the locking lever 6 from detaching from the locking pin 5.

For example, when the mass of the ejection lever 12 and the reset lever 14 are the same, it is possible to prevent the lever from being rotated through providing the distance Lcd, which is from the rotation center of the ejection lever 12 to the linked position of the reset lever 14, and the distance Ldc, which is from the rotation center of the reset lever 14 to the linked position of the ejection lever 12, to be the same even in the case where there are impacts applied from all possible directions.

Further, FIG. 1 shows an example in which an emergency ejection lever balance weight 54 is provided to the emergency ejection lever 16. As shown in FIG. 1, the emergency ejection lever balance weight 54 is provided to protrude on the opposite side to the opening of the "V" from the bent part of the substantial V-shape. Because of the configuration, the center of the gravity is to be positioned in the vicinity of the rotation center.

Thereby, in the same manner as described, each moment generated in the emergency ejection lever 16 is balanced out with each other, thereby suppressing the oscillation of the emergency ejection lever 16. Therefore, it can suppress the oscillation of the locking lever 6 to release the locking and the impact resistance performance can be improved.

Each balance weight 51, 52, 53 and 54 described above may be provided alone or some of them may be provided in combination. Further, all of them may be provided at the same time. As described, by setting the center of the gravity of each member to be in the oscillation center, oscillation of each member by the external impact can be suppressed, thereby improving the stability of the locking mechanism.

Second Embodiment

Figure 5:
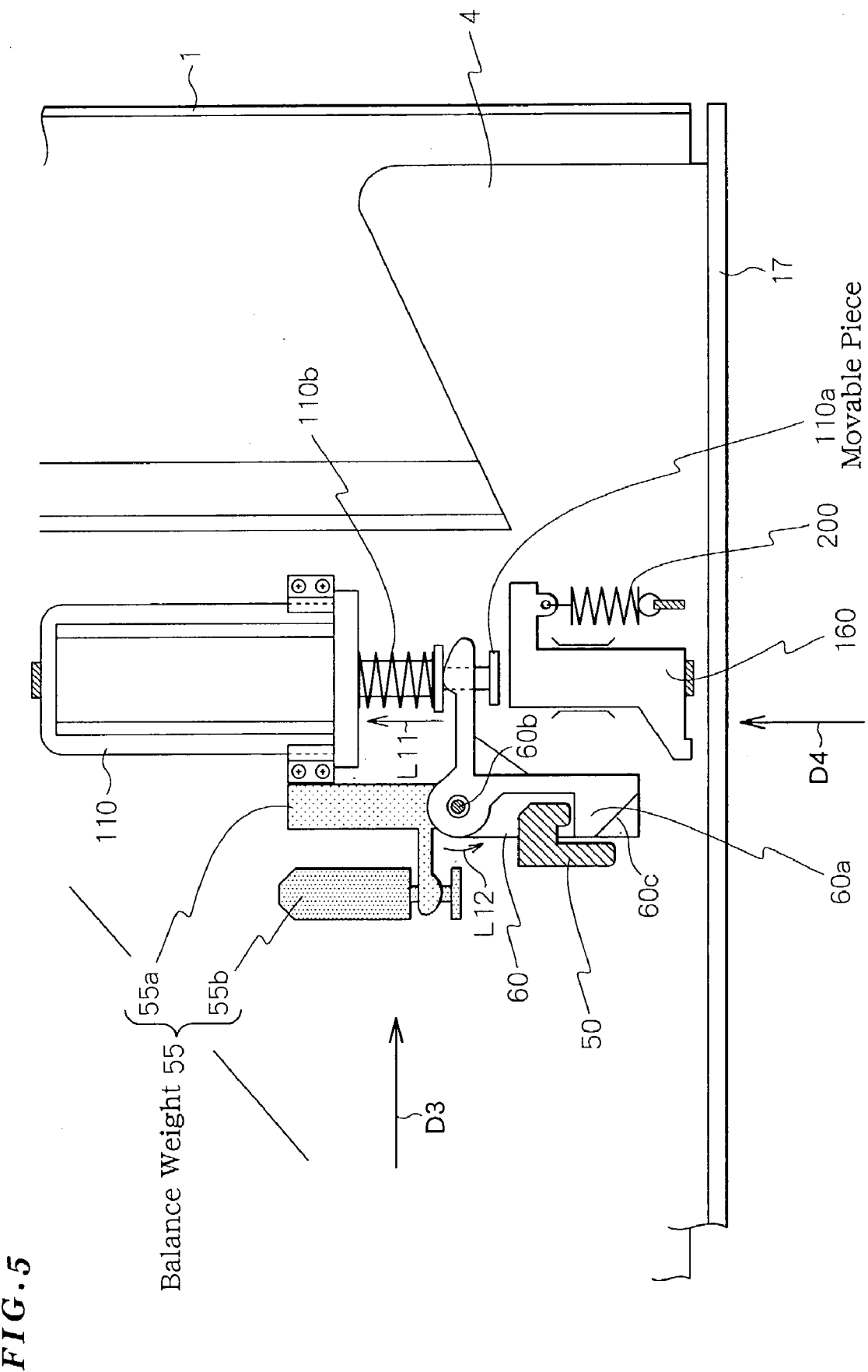
FIG. 5 is a block diagram showing an example of a locking mechanism according to a second embodiment of the present invention.
Figure 6:
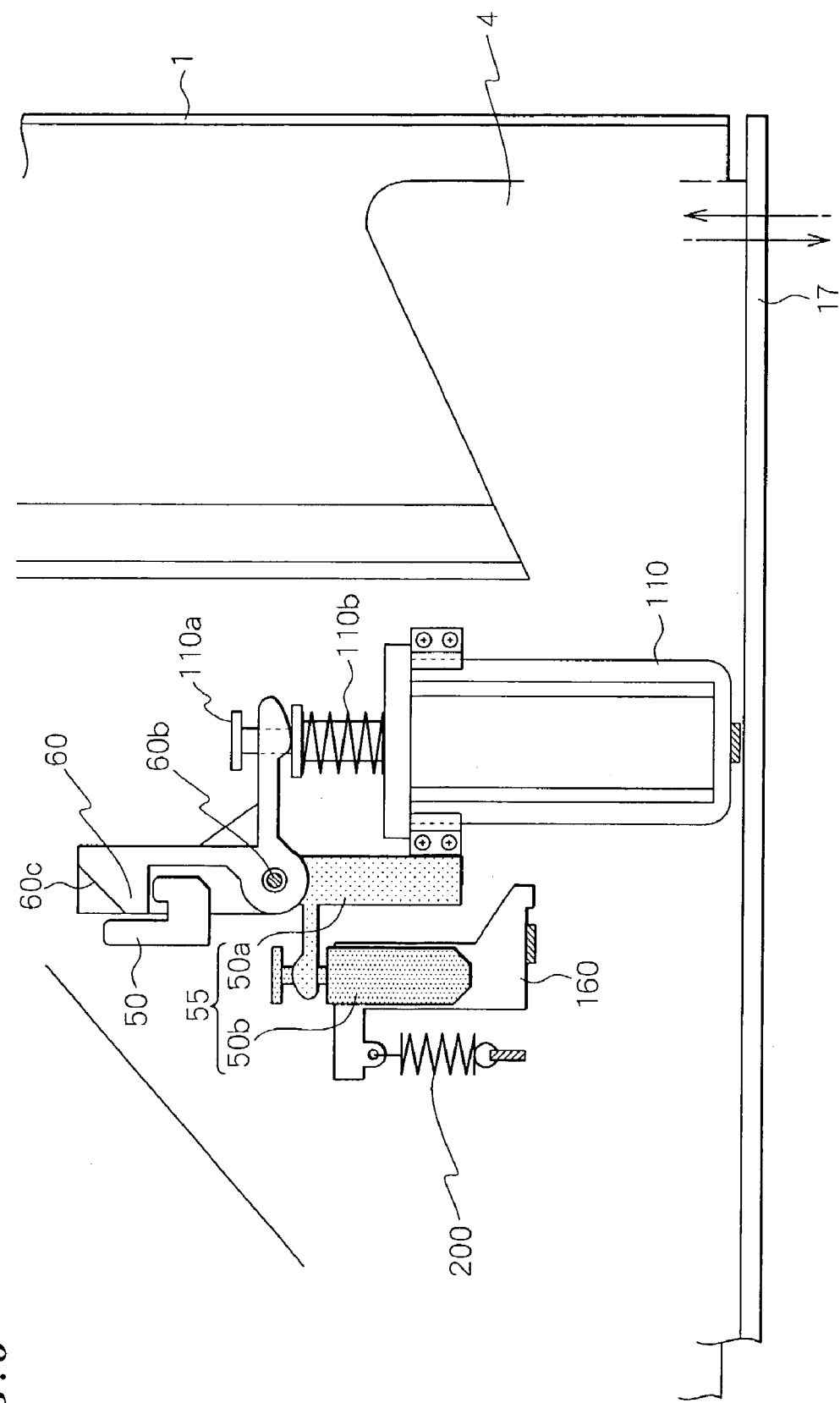
FIG. 6 is a sectional block diagram showing an example of the configuration of the locking mechanism according to the second embodiment of the present invention.

In the followings, a second embodiment of the present invention will be described by referring to FIG. 5 and FIG. 6. FIG. 5 and FIG. 6 are schematic views showing an example of the configuration according to the second embodiment.

The locking mechanism of a disk device according to the embodiment is different from that of the first embodiment described above and comprises an suction drive type solenoid. First, the locking mechanism using the suction drive type solenoid will be described by referring to FIG. 5 showing the configuration of the locking mechanism.

In the locking mechanism shown in FIG. 5, the tray 4 comprises a locking pin 50 and, at the same time, the casing 1 comprises a locking lever 60 supported to be capable of oscillating with a locking part 60a on the tip to be engaged with the locking pin 50 and an suction drive type solenoid 110 as a locking lever movable unit engaged with the other end of the locking lever 60 for oscillating the locking lever 60 in such a direction that the locking part 60a is detached from the locking pin 50. Further, the locking mechanism comprises an emergency ejection lever 160 which is oscillated by an external manual operation and presses a movable piece 110a of the suction drive type solenoid 110 to apply the torque to the locking lever 60 thereby to oscillate the locking lever 60 in such a direction that the locking part 60a is detached from the locking pin 50, and an emergency ejection lever oscillation energizing member 200 which is normally set aside so that the emergency ejection lever 160 does not press the suction drive type solenoid 110.

The locking pin 50 may be provided in the casing 1 and the locking lever 60 and the like may be provided in the tray 4. However, in such a case, the shapes of the locking pin 50 and the locking part 60a shown in FIG. 5, that is, the direction to which the members face, is to be the opposite direction to that shown in FIG. 5 (see FIG. 6).

The locking lever 60 is different from that of the first embodiment in shape but has the same function. In other words, the locking part 60a formed in one end part of the substantial L-shaped locking lever 60 which is supported to the casing 1 by a locking lever shaft 60b to be capable of oscillating hooks onto the locking pin 50 fixed to the casing 1. Thereby, the tray 4 is housed inside the casing 1.

The other end of the locking lever 60 is linked with a movable piece 110a of the suction drive type solenoid 110. Thus, the other end of the locking lever 60 is moved according to the shift (in an arrow L11 direction) of the movable piece 110a of the suction drive type solenoid 110. When the other end is moved, the locking lever 60 oscillates (in an arrow L12 direction) with the shaft being the oscillation center. Thereby, the locking part 60a is detached from the locking pin 50 and the tray 4 is ejected from the casing 1. Further, the locking pin 50, and the balance weight 55, the locking lever 60 and like are arranged in such positions that they do not interfere with each other when the tray 4 is inserted into or ejected from the casing 1.

When the tray 4 is housed inside the casing 1, the movable piece 110a of the suction drive type solenoid 110 is in the state being protruded from the cylindrical solenoid main body in the greatest degree. It is achieved by a movable piece pressing member 110b which is a coil spring member interposed between the solenoid main body and the movable piece 110a. The suction drive solenoid 110 operates (in the arrow L11 direction) so as to suck the movable piece 110a, that is, to approach the main body side upon receiving a command from a control circuit (not shown) which is generated when the ejection button is pushed. Thereby, the locking lever 60 is rotated as described and the lock is released.

The tray 4 is pulled out from the casing 1 in the state of the lock being released. When the lock is released and energization to the solenoid 110 stops, the energizing member 10b restores the locking lever 60 to the original position. In this state, when the tray 4 is pushed into the casing, a guide face 60c of the locking lever 60 comes into contact with the locking pin 50 and thereby the locking lever 60 is rotated in a counterclockwise direction, resting the energizing member 110b. Further, when the contact between the locking pin 50 and the locking lever 60 is released by pushing the tray 4 into the casing 1, the locking lever 60 is rotated in a clockwise direction by the energizing member 110b and thereby again engaged to the locking pin 50.

The emergency ejection lever 160 is provided to move in the direction to which the tray 4 is inserted and ejected. The movable piece 110a of the suction drive type solenoid 110 is pressed through pressing the lever 160 into the inside direction (in an arrow L11 direction) of the tray 4 by opposing an emergency ejection lever pulling energizing member 200. Thus, in such a case, the lock is also released. At this time, the emergency ejection lever 160 may be provided to be in contact with the movable piece 110a of the suction drive type solenoid 110 or to be linked therewith.

Furthermore, in the embodiment, as shown in FIG. 5, when the center of the gravity of the locking lever 60 is not in the oscillation center of the locking lever 60, a locking lever balance weight 55 with a prescribed weight is provided to a prescribed part of the locking lever 60, which is on the opposite side to the center of the gravity of the locking lever 60 with respect to the oscillation center. At this time, the suction drive type solenoid 110 is also linked with the locking lever 60. Therefore, it is necessary to take account of the weight of the solenoid 110 in regards to considering the center of the gravity of the locking lever 60. FIG. 5 shows an example of a locking lever balance weight 55. The balance weight 55 comprises a member 55a provided in the oscillation center of the locking lever 60 by being protruded from the oscillation center in the opposite direction to the locking part 60a. It also comprises a member 55b with substantially the same shape and weight as the suction drive type solenoid 110 provided to the oscillation center in the same manner in line symmetrical with respect to the straight line through the locking pin 50 and oscillation center (see the portion filled by dots in FIG. 5).

Thereby, the center of the gravity of the locking lever 60 can be positioned in the vicinity of the rotation center of the locking lever 60 or desirably in the rotation center. Thus, the moment generated in the balance weight 55 can balance out the moment which is generated in the locking lever 60 with which the movable piece 110a and the emergency ejection lever 160 are in contact or linked due to the impact force acting on the movable piece 110a of the solenoid 110, the locking lever 60 itself or the emergency ejection lever 160. Thereby, it becomes possible to suppress the rotation of the locking lever 60 and the impact resistance performance of the locking mechanism can be improved.

For example, when an impact force is applied to the disk device in the arrow D3 direction shown in FIG. 5, moment is generated in the vicinity of the locking part 60a of the locking lever 60 in a counterclockwise direction in FIG. 5 and a torque is applied thereto so as to detach it from the locking pin 50. However, moment is generated in the balance weight 55 in a clockwise direction thereby balancing the moment generated in the locking part 60a. Thus, it can suppress releasing of the locking state. Further, when an impact force is applied in an arrow D4 direction shown in FIG. 5, the emergency ejection lever 160 is moved in the same direction (in the arrow D4 direction) Thereby, the movable piece 110a is pressed and a torque is applied to the locking lever 60 to rotate. However, in such a case, moment opposing the above-mentioned torque is generated in a member of the balance weight 55 denoted by a numeral code 55b, thereby preventing the locking part 60a from detaching from the locking pin 50.

Further, FIG. 6 shows a locking mechanism in which the positioning of the parts of the locking mechanism shown in FIG. 5 is modified. In this locking mechanism, the movable piece 110a of the solenoid and the emergency ejection lever 160 are positioned to be point symmetry with each other with respect to the rotation center of the locking lever 60, and a locking lever balance weight 55 is provided by being installed in the emergency ejection lever 160. In this case, the locking pin 50 is provided on the casing 1 side and the locking lever 60 and the like are provided on the tray 4 side.

The lever 160 and the member 55b of the balance weight 55 are linked through a mechanism by which the straight-line movement of the lever 160 is converted into the rotational movement of the member 55b of the balance weight. Further, a pin 160a of the lever 160 and the member 55b of the balance weight 55 are arranged in such positions that they do not interfere with each other when the tray 4 is inserted or ejected in the state of the lock being released.

By positioning the parts as described, the locking mechanism operates as described. At the same time, it requires no additional space for attaching the locking lever balance weight 55, thereby achieving to save the space occupied by the locking mechanism. Therefore, it becomes possible to provide the balance weight 55 even in an existing model of the locking mechanism which has little extra space so that the impact resistance can be improved.

The present invention has the configuration and functions as described. In the present invention, a balance weight is provided to at least one lever which operates in connection with releasing of the locking. Thus, the torque generated in the lever itself due to an external impact force can be balanced out by moment generated in the balance weight and, at the same time, the balance weight can be attached to the existing model of the locking mechanism. Therefore, the present invention exhibits such excellent effects that the impact resistance performance can be improved easily at a low cost without changing the design of the locking mechanism itself, which cannot be achieved with the conventional locking mechanism.

By setting the balance weight to have such weight that the center of the gravity of a prescribed lever is to be in the rotation center, it becomes possible to suppress the generation of a torque in the lever by an external impact force. Thereby, the impact resistance performance of the locking mechanism can be further improved.

Furthermore, the impact resistance performance can be also improved even in a case where a balance weight cannot be provided in a prescribed lever. In such a case, it is achieved by providing a balance weight in another lever which operates in connection with the lever, since a moment is generated in the balance weight opposing the torque for releasing the locking, which is generated in the prescribed lever due to an external impact force. In other words, the impact resistance performance can be improved by a combination of balance weight provided in each lever so that the versatility of the design can be enhanced.

What is claimed is:

1. A locking mechanism of a disk device, mounted in between a tray for holding and conveying a disk as an information recording medium and a casing for housing the tray to be capable of being inserted and ejected, comprising:

a locking pin mounted on either one of members out of the casing or the tray; a locking lever with a locking part on the tip to be engaged with the locking pin, which is held to be capable of oscillating by the other member out of the casing or the tray; and an ejection lever mounted to be capable of oscillating for keeping or releasing the engagement between the locking pin and the locking part by energizing a prescribed oscillation movement to the locking lever; and a holding unit for keeping the engagement between the locking pin and the locking part through holding one end of the ejection lever against the energizing force in the opposite direction which is normally set beforehand; wherein a balance weight is mounted on the opposite side to the ejection lever with respect to the oscillation center of the ejection lever.

2. The locking mechanism of a disk device as claimed in claim 1, further comprising a reset lever, wherein:

the reset lever oscillates the ejection lever by being pressed by the locking pin when the tray is ejected from the casing, and moves one end of the ejection lever to a position to be held by the holding unit.

3. A locking mechanism of a disk device for housing a tray inside a casing, which is provided in the tray for holding a disk to be an information recording medium and the casing for housing the tray to be capable of being inserted and ejected, comprising:
- a locking pin mounted on either one of members out of the casing or the tray; while comprising:
- on the other member out of the casing or the tray, a locking lever having a locking part on the tip to be engaged with the locking pin, which is supported to be capable of oscillating; an ejection lever supported to be capable of oscillating for pressing a prescribed part of the locking lever so as to oscillate the locking lever in such a direction that the locking part is detached from the locking pin; and a holding unit for holding a movable piece provided on one end of the ejection lever so as to set aside the ejection lever to such a position that the ejection lever does not press the locking lever; wherein
- a balance weight having a prescribed weight is provided on the opposite side to the center of the gravity of the ejection lever with respect to the oscillation center of the ejection lever.

4. The locking mechanism of a disk device as claimed in claim 3, wherein the balance weight is a balancer provided to the ejection lever for setting the center of the gravity of the ejection lever to be in the oscillation center of the ejection lever or the vicinity.

5. The locking mechanism of a disk device as claimed in claim 3, wherein a balance weight having a prescribed weight is provided on the opposite side to the center of the gravity of the locking lever with respect to the oscillation center of the locking lever.

6. The locking mechanism of a disk device as claimed in claim 5, wherein the balance weight is a balancer provided to the locking lever for setting the center of the gravity of the locking lever to be in the oscillation center of the locking lever or the vicinity.

7. The locking mechanism of a disk device as claimed in any one of claims 3, further comprising a reset lever being supported to be capable of oscillating while a part of which is being linked with the ejection lever, which comes to be in slide-contact with the locking pin due to a position shift generated between the tray and the casing by the inserting and ejecting action of the tray, and thereby receives pressuring force from the locking pin to oscillate the ejection lever so that the movable piece comes to be in contact with the holding unit.

8. The locking mechanism of a disk device as claimed in claim 7, wherein a balance weight having a prescribed weight is provided on the opposite side to the center of the gravity of the reset lever with respect to the oscillation center of the reset lever.

9. The locking mechanism of a disk device as claimed in claim 8, wherein the balance weight is a balancer provided in the reset lever for setting the center of the gravity of the reset lever to be in the oscillation center of the reset lever or the vicinity.

10. The locking mechanism of a disk device as claimed in claim 3, further comprising an emergency ejection lever being supported to be capable of oscillating while a part of which is being linked with the locking lever, which is oscillated by an external manual operation while energizing a torque to the locking lever, and thereby oscillates the locking lever in such a direction that the locking part of the locking lever is detached from the locking pin.

11. The locking mechanism of a disk device as claimed in claim 10, wherein a balance weight having a prescribed weight is provided on the opposite side to the center of the gravity of the emergency ejection lever with respect to the oscillation center of the emergency ejection lever.

12. The locking mechanism of a disk device as claimed in claim 11, wherein the balance weight is a balancer provided in the emergency ejection lever for setting the center of the gravity of the emergency ejection lever to be in the oscillation center of the emergency ejection lever or the vicinity.

13. A locking mechanism of a disk device for housing a tray inside a casing, which is provided in the tray for holding a disk to be an information recording medium and the casing for housing the tray to be capable of being inserted and ejected, comprising:
- a locking pin mounted on either one of members out of the casing or the tray; while comprising:
- on the other member out of the casing or the tray, a locking lever having a locking part on the tip to be engaged with the locking pin, which is supported to be capable of oscillating; an ejection lever supported to be capable of oscillating for pressing a prescribed part of the locking lever so as to oscillate the locking lever in such a direction that the locking part is detached from the locking pin; and a holding unit for holding a movable piece provided on one end of the ejection lever so as to set aside the ejection lever to such a position that the ejection lever does not press the locking lever; wherein
- a balance weight having a prescribed weight is provided on the opposite side to the center of the gravity of the locking lever with respect to the oscillation center of the locking lever.

14. A locking mechanism of a disk device for housing a tray inside a casing, which is provided in the tray for holding a disk to be an information recording medium and the casing for housing the tray to be capable of being inserted and ejected, comprising:
- a locking pin mounted on either one of members out of the casing or the tray; while comprising
- on the other member out of the casing or the tray, a locking lever having a locking part on the tip to be engaged with the locking pin, which is supported to be capable of oscillating; an ejection lever supported to be capable of oscillating for pressing a prescribed part of the locking lever so as to oscillate the locking lever in such a direction that the locking part is detached from the locking pin; a holding unit for holding a movable piece provided on one end of the ejection lever so as to set aside the ejection lever to such a position that the ejection lever does not press the locking lever; and a reset lever being supported to be capable of oscillating while a part of which is being linked with the ejection lever, which comes to be in slide-contact with the locking pin due to a position shift generated between the tray and the casing by the inserting and ejecting action of the tray, and thereby receives pressuring force from the locking pin to oscillate the ejection lever so that the movable piece comes to be in contact with the holding unit, wherein
- a balance weight having a prescribed weight is provided on the opposite side to the center of the gravity of the reset lever with respect to the oscillation center of the reset lever.

15. A locking mechanism of a disk device for housing a tray inside a casing, which is provided in the tray for holding a disk to be an information recording medium and the casing for housing the tray to be capable of being inserted and ejected, comprising:

a locking pin mounted on either one of members out of the casing or the tray; while comprising:

on the other member out of the casing or the tray, a locking lever having a locking part on the tip to be engaged with the locking pin, which is supported to be capable of oscillating; an ejection lever supported to be capable of oscillating for pressing a prescribed part of the locking lever so as to oscillate the locking lever in such a direction that the locking part is detached from the locking pin; a holding unit for holding a movable piece provided on one end of the ejection lever so as to set aside the ejection lever to such a position that the ejection lever does not press the locking lever; and an emergency ejection lever being supported to be capable of oscillating while a part of which is being linked with the locking lever, which is oscillated by an external manual operation while energizing a torque to the locking lever, and thereby oscillates the locking lever in such a direction that the locking part of the locking lever is detached from the locking pin, wherein a balance weight having a prescribed weight is provided on the opposite side to the center of the gravity of the emergency ejection lever with respect to the oscillation center of the emergency ejection lever.

16. A locking mechanism of a disk device for housing a tray inside a casing, which is provided in the tray for holding a disk to be an information recording medium and the casing for housing the tray to be capable of being inserted and ejected, comprising:

a locking pin mounted on either one of members out of the casing or the tray; while comprising:

on the other member out of the casing or the tray, a locking lever having a locking part on the tip to be engaged with the locking pin, which is supported to be capable of oscillating; a locking lever movable unit to be engaged with the other end portion of the locking lever for oscillating the locking lever in such a direction that the locking part is detached from the locking pin; wherein a balance weight having a prescribed weight is provided on the opposite side to the center of the gravity of the locking lever with respect to the oscillation center of the locking lever.

17. The locking mechanism of a disk device as claimed in claim 16, wherein the balance weight is a balancer provided in the locking lever for setting the center of the gravity of the locking lever to be in the oscillation center of the locking lever or the vicinity.

* * * * *